United States Patent Office 3,109,724
Patented Nov. 5, 1963

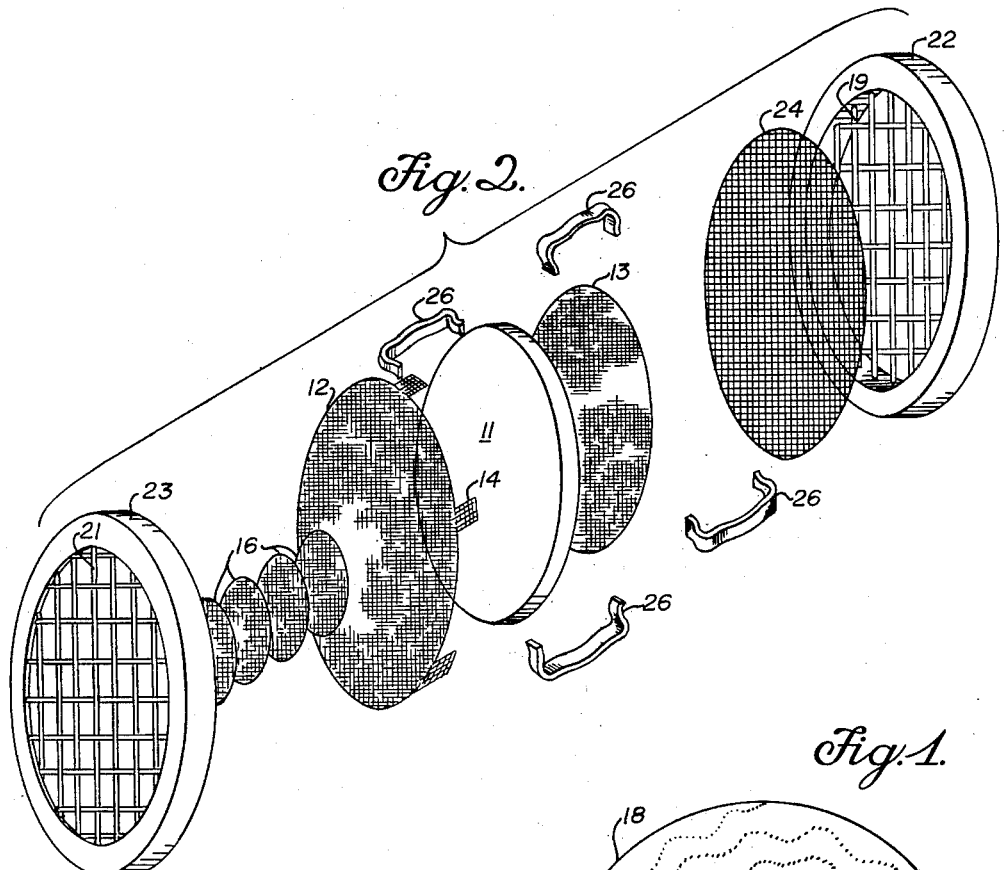
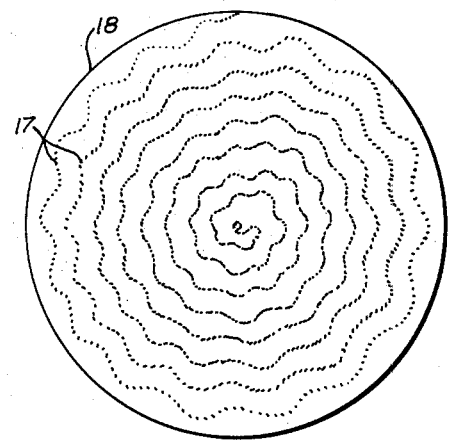
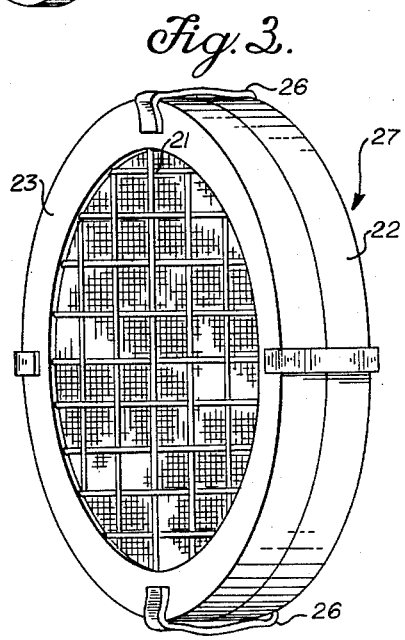

3,109,724
FILTER FOR HIGH VELOCITY GAS STREAMS
Richard A. Heckman and Henry F. Warner, Livermore, Calif., assignors to the United States of America as represented by the United States Atomic Energy Commission
Filed Jan. 26, 1961, Ser. No. 85,169
4 Claims. (Cl. 55—514)

This invention relates to filters for air streams and particularly to air filters for use in air-sampling rockets in which the air stream velocity is very high with reference to the filter medium.

The invention provides a filter which can withstand the friction and heat stress of supersonic blasts of air, yet which at the same time efficiently collects particulate matter suspended therein, even in the submicron range. The filter medium comprises specially selected organic fibers coated with a substance which is molten and adhesive at the temperature of operation. The fibers, in the form of a mat, are reinforced on each side by fabric materials joined in a tear-resistant manner and the assembly is disposed between rigid screens held within a case adapted to be disposed in the air stream to be sampled. Additional novelty is seen in the precise embodiment discussed hereinafter.

In recent years the study of particle distribution in the earth's atmosphere has become increasingly important. Such studies have been conducted in connection with the determination of radioactive fallout, the mapping of meteorological disturbances and air pollution control measures. A very specialized type of study has resulted from the weapon tests of nuclear weapons by the United States Atomic Energy Commission and by the Armed Forces of the United States of America. During the testing of nuclear weapons it is desirable to collect air borne "atomic debris" at various times after detonation within the "mushroom" cloud characteristic of such tests. An obvious solution to this need is to take air samples during the flight of an airplane or rocket through the cloud at various altitudes and times. Since the cloud may be several miles in diameter, it is generally desirable to traverse the space to be sampled as quickly as possible in order that the sample will be uniform and representative.

While volumetric container air samplers, electrostatic precipitators, micro-filters and other conventional apparatus may suffice to sample air and particulate matter suspended therein for many operations, representative samples cannot easily be obtained with rockets or airplanes traveling at ultra-sonic speeds, particularly when a large range of particle sizes are present in varying concentrations, as in nuclear tests. For example, particles of various sizes and densities tend to be deflected non-uniformly from the openings of air scoops and the openings of evacuated air samplers. Conventional organic fibrous matter, e.g., cellulosic filter materials, are easily broken or torn loose, together with any entrained particulate matter, by decelerations of 20 g's or more which occur during the slowing down period of sampler rockets. In addition, the momentum of larger particles and air friction is sufficient to damage or render ineffective most filters and filter materials at supersonic speeds.

In prior weapon's tests the problem has not been solved satisfactorily and the data obtained has been incomplete or not entirely representative. One method of sampling and detecting various nuclide species has been to attach filter paper to the leading surfaces of drone aircraft traversing a cloud, but obviously only qualitative data may be obtained. As indicated hereinabove the best results have been obtained with rocket type samplers in which a suitable particle filter is installed in the nose cone of a rocket. At a predetermined time in the rocket trajectory the nose cone is blown off or otherwise opened to the atmosphere, permitting particles to impinge upon and be collected by the filter. However, cellulosic filter media porous enough to serve as representative samplers tend to tear or break. More structurally stable materials such as metal screening or fiberglass mats do not provide a soft matrix onto which particles can embed themselves and be retained. Attempts to bring about precipitation or retention by volumetric retainers, electrostatic precipitators and other combinations have also been relatively unsatisfactory. Coating fibers with solid adhesives to improve collection efficiencies does not provide satisfactory results with a pressure drop of 25–50 p.s.i. across the filter face, as in rocket nose cones.

From the foregoing it may be seen that there exists a need for a cellulosic (or other organic fiber) filter unit adaptable to use in environments in which gases traverse the filter media at supersonic speeds. The filter media should have a high collecting efficiency and a high breaking or tear strength and should be well supported without distortions in the pore structure at high gas speeds, yet porous enough to provide a minimum of resistance to airflow. Specifically in embodiments designed for installation in the nose cone of a rocket the filter media must be able to withstand severe wind blast effects and high temperatures resulting from air friction, i.e., temperatures up to about 300° C.

There has now been invented an air filter unit, conveniently in the form of a cartridge, which can be inserted into any flow chamber, and which withstands the conditions discussed hereinabove. In the preferred embodiment sheets of extremely uniform small diameter cellulosic fibers are used as filter media. The fibers are mounted on a scrim backing. Prior to use they are impregnated with a quantity of stearic acid equal to 15–20 wt. percent of the weight of the fibers. Alternatively, other impregnants may be substituted which become molten and abrasive in the temperature range of 70–290° C., without flowing and clogging the pores. Front and back fabric cover members and reinforcing members are stitched onto the filter with a zig-zag stitch preferably in the shape of a sine wave having an amplitude twice the wave length. The assembly is compressed between retainer members having rims which overlap the filter media assembly and supporting screens in the annular regions. High velocity air flow tests with the filter media constructed in accordance with the preferred embodiment indicate a collection efficiency of greater than 99% for all particles sizes and also the requisite accompanying strength and tear resistance.

Accordingly, an object of the invention is to provide a filter assembly for removing particulate matter from air. Specifically, the filter should operate efficiently with a pressure drop of 25–50 p.s.i. across the filter, without tearing, the filter media even when simultaneously subjected to decelerations of 20 g's or more, and temperatures up to about 290° C. The filter should further be unitized in a physical embodiment adaptable for incorporation into air stream channels, such as an intake scoop or duct of rockets used in nuclear weapons tests.

Another object of the invention is to provide a filter pad containing a filter medium sufficiently porous to permit passage of large volumes of gases under pressure yet sufficiently retentive to prevent passage of air borne particles in the micron size range.

A further object is to provide a filter media with an adhesive coating on individual fibers which is molten at the operating temperature of the filter or gas stream.

A further object of the invention is to provide a filter assembly containing a fibrous organic filter medium in which the medium is contained between coarse cloth covers sewed together with a spiral zig-zag stitching.

The invention will be better understood upon examination of the following description and drawings of which:

FIGURE 1 is a perspective view of the assembled and stitched filter medium of the invention showing the filter paper between layers of scrim backing;

FIGURE 2 is an exploded view of the filter assembly of the preferred embodiment of the invention; and FIGURE 3 is a perspective view of the filter assembly of the preferred embodiment of the invention.

In the practice of the invention there is first provided an organic filter medium capable of retaining air borne particles in the micron size range yet porous enough to permit passage of air at high velocities without physical injury to the filter medium fibers. More particularly, in the preferred embodiment there is provided a filter medium fabricated from extremely pure small diameter cellulose fibers matted on a scrim backing having a preferred density of 12.75 grams/square centimeter with a deviation of less than 10 percent. Obviously other media may be used even though the efficiency of the filter will vary with the porosity density and other variables.

In practice Knowlton Bros. Co., Watertown, New York, "IPC" type filter paper has proven entirely satisfactory filter medium in the fabrication of filters designed to withstand supersonic pressures "IPC" type cellulose filter media consists of micron diameter, millimeter long, fibers of pure cellulose matted together on a scrim backing, in a very uniform manner so that the density is maintained within the specifications indicated above.

The raw filter media as provided is next cut into frames adapted to cover the cross sectional area of the filter face, and the media fibers are coated with an organic material which is molten and/or adhesive at the operating temperature of the filter so that a soft matrix is provided into which the incident particles embed themselves and thus are firmly retained by the filter. In the preferred embodiment of the invention a stearic acid coating is used. However, the coating-to-fiber weight ratio is fairly critical; less than 15% stearic acid does not provide adequate adhesive action, and more than 20% clogs the pores of the paper thereby rendering it inefficient. Stearic acid has proven most advantageous for the reason that it is molten and adhesive at the contemplated operating range of the preferred filter embodiment, 70–290° C. Also, the vapor pressure is so low as to minimize vaporization of the coating from the fibers of the filter paper.

In the impregnation of the "IPC" type filter media with stearic acid the stearic acid is dissolved in chloroform to form a solution containing 1.95% stearic acid by weight, in the preferred embodiment. The solution is placed in an impregnating tank at room temperature and each frame assembly, as hereinafter discussed, or simply each frame alone, if desired, is immersed for 1.50 minutes. The frame is then removed and the excess solution is drained for ten minutes, before being placed in a drying oven which directs a 65° C. air stream parallel to the filter surface for fifteen minutes.

In the preferred embodiment of the filter unit, shown in FIGURE 2, a circular frame 11 of the impregnated filter paper is disposed within a wrapping of loosely woven fabric comprising a front cover 12 and a rear cover 13. The front cover is conveniently cut larger than the rear cover and is radially notched a short distance inwardly to form segments 14 which fold over and overlap the rear cover 13. Four additional reinforcing discs 16 of the same fabric, each having a smaller diameter than the central frame 11, are centrally disposed flush against the outside of cover 12 on the front side exposed to the wind blast.

The inner frame 11, covers 12 and 13, and reinforcing layers 16 are sewed or otherwise fastened together in any convenient manner. However, the greatest tear resistance is imparted by means of a zig-zag spiral stitch the shape of a sine wave having an amplitude equal to twice the wavelength, as indicated by stitching 17 of filter assembly 18 in FIGURE 1. In practice an amplitude of 1.5 cm. has been used and adjacent turns of the spiral are stitched as close together as practical, about one-sixteenth of an inch.

For use in tubular air channels, e.g., nose cones of rockets, the filter assembly 18 may be disposed between coarse screens 19 and 21, each being within retaining rings 22 and 23 respectively. Additional support is provided by a somewhat finer screen 24 behind the filter assembly 18 on the exit side. Rings 22 and 23 are preferably sufficiently large or bulky to permit firm engagement and retention of circumferentially disposed spring clamps 26 which compress the two screens 19 and 21 together forming the filter unit 27 which is shown in perspective in FIGURE 3.

The filter unit 27 may be disposed in any channel or tube of appropriate diameter through which the air to be filtered is to flow and which has retainer means to hold the unit 27 therein. Specifically, for air sampler rockets the filter unit 27 is inserted onto a groove milled into the inner surface of the rocket nose cone (not shown). The mating halves of the rocket are bolted together with explosive bolts, so that the filter can be exposed to the atmosphere at any pre-selected time by detonating the explosive bolts by radio signal, internal timing device or other means.

Filter units 27 prepared in accordance with the foregoing description of the preferred embodiment were tested for impact resistance by blasting them with sand particles 100 microns diameter fired from a shotgun placed 10 feet away from the face of the filter. The average sand particle velocity was 2200 ft./sec., or about twice the speed of sound at sea level. There was no visible damage to the filter sample following the sand blast.

Filter units 27 prepared in accordance with the foregoing description of the preferred embodiment were also tested for collection efficiency by placing them in a Mach 2 wind tunnel air screen. Sand particles 37–44 microns in diameter were injected into the air stream so as to provide surface loading on the filter paper of from 0.8 to 2.5 grams of sand per equar foot of filter surface. The collection efficiency was better than 99 percent.

While the invention has been described with respect to several preferred embodiments, it will be apparent to those skilled in the art that numerous variations and modifications may be made within the scope and spirit of the invention and thus it is not intended to limit the invention except as defined in the following claims.

What is claimed is:

1. In a filter unit for insertion into the nose cone of a supersonic air sampling rocket, the combination comprising a cellulose fiber medium matted together on a scrim backing, said fibers having a mean diameter in the range of one micron and a length of at least one millimeter, said matted fibers having a mean density of about 12.75 grams per square centimeter, a thin coating of stearic acid on said fibers, said acid being evenly disposed thereon in a quantity consisting of 15 to 20% by weight of the weight of said fibers, front and back protective loose weave fabric covers compressed against said fibers, thread stitched therebetween to secure all portions of said matted fibers and covers to form a filter assembly, said stitching forming a zig-zag spiral pattern in the form of a sine wave having an amplitude equal to twice the wave length, and means for retaining said filter assembly within an open frame adapted to be disposed within an air flow channel.

2. The filter unit of claim 1 in which the amplitude of the sine wave of the spiral stitching is 1.5 centimeters.

3. The filter unit of claim 1 in which loose weave fabric reinforcing discs are centrally disposed on the outside of said front cover prior to the stitching thereof, and the reinforcing discs are stitched along with the covers and central mat of fibers.

4. The filter unit of claim 1 in which said retaining means consists of coarse wire screens mounted across retaining rings which are held compressively with the filter assembly therebetween by means of clips disposed circumferentially around said rings.

References Cited in the file of this patent

UNITED STATES PATENTS

| | | |
|---|---|---|
| 2,083,132 | Williams et al. | June 8, 1937 |
| 2,521,984 | Lang | Sept. 12, 1950 |
| 2,579,984 | Trowbridge | Dec. 25, 1951 |
| 2,708,982 | McGuff et al. | May 24, 1955 |
| 2,780,308 | Mullin et al. | Feb. 5, 1957 |
| 2,784,132 | Maisel | Mar. 5, 1957 |
| 2,871,977 | Kling | Feb. 3, 1959 |

FOREIGN PATENTS

| | | |
|---|---|---|
| 489,272 | Italy | Jan. 16, 1954 |
| 849,263 | Great Britain | Sept. 21, 1960 |